No. 768,936. PATENTED AUG. 30, 1904.
H. J. GAEDTKE.
ANIMAL TRAP.
APPLICATION FILED JUNE 1, 1904.
NO MODEL.

Witnesses:
Hermann W. Bormann
E. Bormann

Inventor:
Hermann J. Gaedtke
By Hermann Bormann
Att'y.

No. 768,936.                                     Patented August 30, 1904.

UNITED STATES PATENT OFFICE.

HERMANN J. GAEDTKE, OF PHILADELPHIA, PENNSYLVANIA.

ANIMAL-TRAP.

SPECIFICATION forming part of Letters Patent No. 768,936, dated August 30, 1904.

Application filed June 1, 1904. Serial No. 210,660. (No model.)

*To all whom it may concern:*

Be it known that I, HERMANN J. GAEDTKE, a subject of the Emperor of Germany, (but having declared my intention of becoming a citizen of the United States,) residing at Philadelphia, in the county of Philadelphia and State of Pennsylvania, have invented a new and useful Animal-Trap, of which the following is a specification.

My invention relates to animal-traps, and more particularly to such in which a swinging bottom operates to deliver a nibbling animal into a receptacle below the bottom of the trap; and the objects of my improvement are, first, to provide a reliable trap of simple construction; second, to provide means by which the trap is reset immediately after the delivery of the animal into the said receptacle, and, third, to so arrange and design the mechanism of the swinging bottom as that the said bottom will be held rigidly in place until released by the weight of the animal upon a swinging table arranged below the bait.

I attain these objects by the mechanism composing my animal-trap and illustrated in the accompanying drawings, in which—

Figure 1:
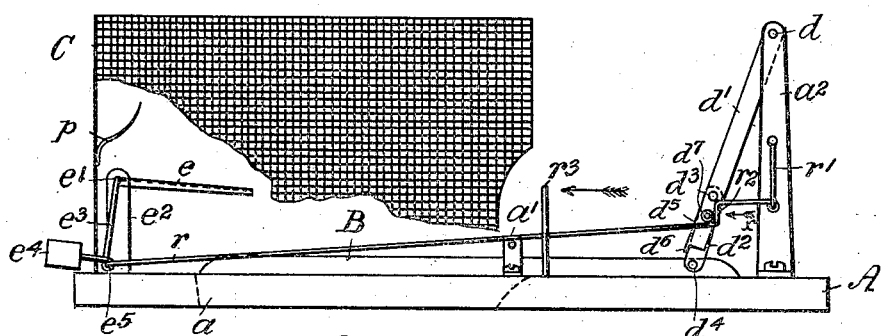
Figure 2:
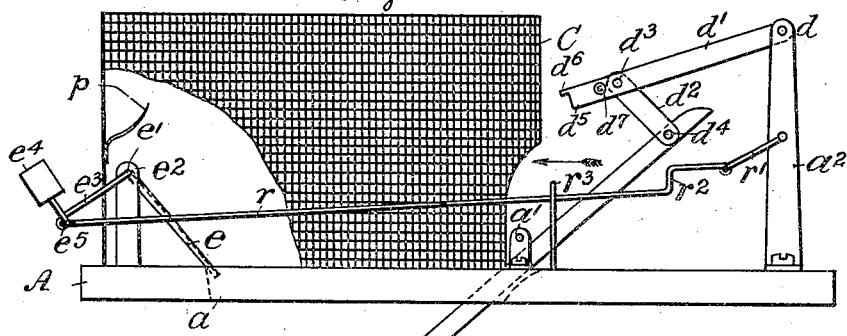
Figure 3:
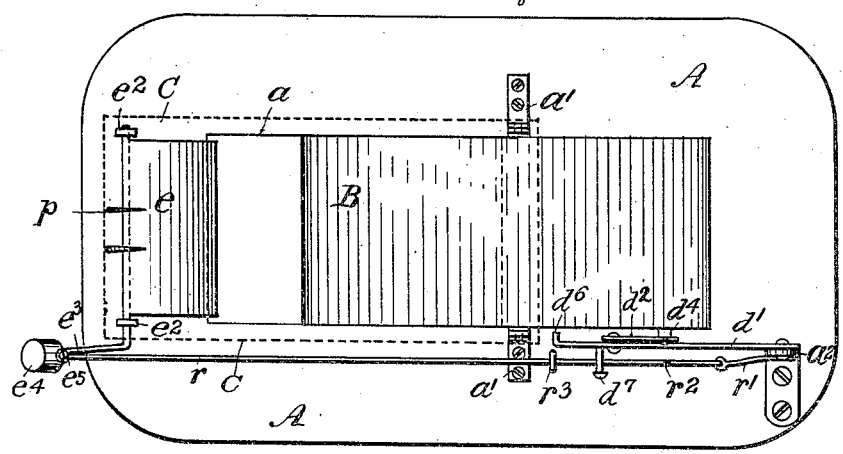

Figure 1 is a sectional elevation of the trap "set." Fig. 2 is a similar elevation showing the trap with its swinging bottom and table in operative position to deliver the animal into a receptacle below the said trap, and Fig. 3 is a top view of the trap.

Referring to the drawings for a further description of my invention, A is the base of the trap provided with the opening $a$ and adapted to be resting on a receptacle. (Not shown.)

B is the swinging bottom, trunnioned in the bearings $a'$ of the base A.

C is a cage, of wire-netting, open at the end (indicated by the arrow) and secured to the said base in any suitable manner.

Near one corner of the base A is secured a post $a^2$, and at the top thereof is pivoted at $d$ a double-knee-jointed lever $d'$ $d^2$. These levers are hinged at $d^3$, and the lower end of the lever $d^2$ is pivotally secured to the swinging bottom B at $d^4$. The lever $d'$ is provided with an extension $d^5$ and a bent projection or lug forming a back-stop $d^6$, impinging on the upper edge of the lever $d^2$ when the trap is set, so that the bottom B, capable of swinging about the trunnions $a'$, is held positively in place, as shown in Fig. 1. Adjacent to the hinge-point $d^3$ is secured a pin $d^7$ to the lever $d'$ for the purpose of breaking the knee-joint of the levers $d'$ and $d^2$ whenever a pressure in the direction of the arrow $x$ is exerted on the pin $d^7$ to cause the tilting of the swinging bottom B, and this is accomplished by an oscillating table $e$, trunnioned, by means of a shaft $e'$, to the standards $e^2$, located inside of the cage C. One end of the trunnioned shaft $e'$ is bent downward and forms a lever $e^3$, having at its free extremity a weight $e^4$ to keep the table $e$ in its normal position, as shown in Fig. 1. Near the weight $e^4$ is provided an eye $e^5$, to which is hinged one end of the rod $r$, the other end being pivotally connected to a link $r'$, suspended from the post $a^2$. In the rod $r$ is formed an offset $r^2$ to impinge against the pin $d^7$ when the table $e$ and swinging bottom B are in normal position, as shown in Fig. 1. To guide the rod $r$ in its longitudinal and upward movement, a staple $r^3$ is fastened in the base A.

The operation of my animal-trap is as follows: The swinging bottom B and table $e$ being in normal or set position, as shown in Fig. 1, bait is attached to the prongs $p$, and should an animal attempt to remove the bait it will enter the trap over the firmly-held bottom B and put its fore legs on the table $e$, which at once will swing downwardly, moving the rod $r$ toward the left, and the offset $r^2$ forces the pin $d^7$ in the same direction, thus breaking the knee-joint at $d^3$ and cause the bottom B to swing about its trunnion $a'$, precipitating the animal into the receptacle (not shown) below the base A. The table $e$ in its downward move will impinge against the edge of the opening $a$ and form a chute, so that the animal cannot find a hold anywhere and must slide down the inclines formed by the table $e$ and bottom B, as shown in Fig. 2. After the animal is precipitated the table $e$, facilitated by the weight $e^4$ and the bottom B, will return to its normal position, as shown in Fig. 1, unsolicited by springs or other means, and be ready again for another animal.

It is obvious that modifications may be made to the arrangement and construction of the various parts comprising my animal-trap without departing from the spirit of the invention.

Having thus described the nature and objects of my invention, what I claim as new, and desire to secure by Letters Patent, is—

1. An animal-trap comprising a base, an opening in said base, a swinging bottom adapted to cover said opening, a standard on said base, a double-knee-jointed lever hinged to said standard and said base, a swinging table inside the trap, a weighted lever extending from said table, a rod connected to said weighted lever, a link hinged to said standard and carrying the other end of the rod, said rod adapted to break the joint of the double-knee-jointed lever, substantially as and for the purpose set forth.

2. An animal-trap comprising a base, an opening in said base, a swinging bottom adapted to cover said opening, a standard on said base, a double-knee-jointed lever hinged to said standard and said base, a swinging table inside the trap and means between said table and double-knee-jointed lever to break the knee-joint substantially as and for the purpose set forth.

3. An animal-trap comprising a base, a swinging bottom adapted to cover said opening, a standard on said base, a double-knee-jointed lever hinged to said standard and said base, and means for breaking the knee-joint of said lever substantially as and for the purpose set forth.

In witness whereof I have hereunto set my hand in the presence of two subscribing witnesses.

HERMANN J. GAEDTKE.

Witnesses:
   OLIVER S. KEELY,
   HERMANN BORMANN.